United States Patent [19]

Marton

[11] Patent Number: 4,836,493

[45] Date of Patent: Jun. 6, 1989

[54] APPARATUS FOR HOLDING AND RETAINING A LADDER

[76] Inventor: Joseph S. Marton, 608-½ N. Sycamore, Los Angeles, Calif. 90036

[21] Appl. No.: 176,358

[22] Filed: Mar. 31, 1988

[51] Int. Cl.$^4$ .............................................. F16M 13/00
[52] U.S. Cl. ................................... 248/558; 248/304; 248/309.1
[58] Field of Search ................... 248/309.1, 558, 200, 248/205.1, 303, 304, 301; 182/93

[56] References Cited

U.S. PATENT DOCUMENTS

| | | | |
|---|---|---|---|
| 1,798,768 | 3/1931 | Vance | 248/304 |
| 1,805,984 | 5/1931 | Hull | 248/304 |
| 3,224,721 | 12/1965 | Malmquist | 248/303 X |
| 3,313,509 | 4/1967 | Lockert | 248/301 X |
| 3,532,312 | 10/1970 | Kopk | 248/303 X |
| 3,627,248 | 12/1971 | Nelson | 248/309.1 |
| 3,729,159 | 4/1973 | Foster | 248/205.1 X |
| 4,257,492 | 3/1981 | Rasada, Jr. et al. | 182/93 X |

Primary Examiner—Ramon O. Ramirez
Attorney, Agent, or Firm—Thomas I. Rozsa

[57] ABSTRACT

An apparatus which is mounted on a surface such as a wall and is used to safely and efficiently hold and retain a ladder when not in use. The apparatus is affixed to a wall and includes an arcuate surface with a stopping block at its outwardmost portion such that a conventional step ladder which contains a cylindrical handle can be mounted and held on the arcuate surface and supported thereby. The stopping block serves to assure that the handle will not roll off the arcuate surface. In an alternative embodiment included within the same apparatus, thre is a sloped surface with a downward slope relative to the wall and offset from the wall by a lateral surface which is affixed to a wall. With this alternative embodiment, a conventional ladder can be held on the sloped surface by its top in a manner which will prevent the ladder from touching and scratching the wall to which the apparatus is affixed. With either embodiment, if the apparatus is mounted sufficiently high on the wall, the body of the ladder will rest off the floor and generally parallel to and against the wall, thereby assuring that the ladder is out of the way and that no person or animal walking adjacent the area where the ladder is stored will accidentally kick into the ladder.

6 Claims, 1 Drawing Sheet

APPARATUS FOR HOLDING AND RETAINING A LADDER

FIELD OF THE INVENTION

The present invention relates to apparatus for holding and retaining objects when not in use and more particularly apparatus used to retain tools and physical objects, and in particular ladders, when not in use. The apparatus concerns an attachment to a wall which may be reversibly attached in order to accommodate different types of ladders.

DESCRIPTION OF THE PRIOR ART

There is no specific apparatus known in the prior art for holding and retaining a ladder when not in use. In most cases, the ladder is merely propped up against a wall at an angle relative to the wall sufficient to enable the top of the ladder to lie against the wall while the base of the ladder rests on the floor. This creates several problems. First, it is easy to kick into the ladder and knock it over, thereby possible causing damage when the fallen ladder hits something or alternatively scratching the wall.

Therefore, a significant need exists for an apparatus which can safety and securely hold and retain a ladder when not in use in a manner which will assure that the ladder is not in the way of people walking in the adjacent area.

SUMMARY OF THE PRESENT INVENTION

The present invention is an apparatus which is mounted on a surface such as a wall and is used to safely and efficiently hold and retain a ladder when not in use.

It has been discovered, according to the present invention, that if a transverse surface which may be arcuate with a stopping block at its outwardmost portion is affixed to a wall, then a conventional step ladder which contains a cylindrical handle can be mounted and held on the transverse arcuate surface and supported thereby. The stopping block serves to assure that the handle will not roll off the arcuate surface. If the apparatus is mounted sufficiently high on the wall, the body of the step ladder will rest off the floor and generally parallel to and against the wall, thereby assuring that the ladder is out of the way and that no person or animal walking adjacent the area where the ladder is stored will accidentally kick into the ladder.

It has also been discovered, according to the present invention, that the apparatus as just described can also hold a conventional extension ladder by having the uppermost step rest on the arcuate surface and blocked thereon by the stopping block.

It has further been discovered, according to the present invention, that if a sloped surface with a downward slope relative to the wall is offset from the wall by a lateral surface with the lateral surface affixed adjacent to a wall, then a conventional ladder can be held on the sloped surface by its top in a manner which will prevent the ladder from touching and scratching the wall to which the apparatus is affixed. If the apparatus is mounted sufficiently high on the wall, the body of the ladder will rest off the floor and generally parallel to and against the wall, thereby assuring that the ladder is out of the way and that no person or animal walking adjacent the area where the ladder is stored will accidentally kick into the ladder.

It has additionally been discovered, according to the present invention, that if an apparatus has one side formed into an arcuate member with a stopping block, and its opposite side formed into a lateral section extending into a sloped section, with at least one and preferably two transverse openings running through the thickness of the member between the two surfaces to enable the apparatus to be affixed to a wall, then one apparatus can be reversible and be used to hold any type of ladder.

It is therefore an object of the present invention to provide an apparatus which can safely and effectively hold and retain a step ladder or extension ladder when not in use.

It is another object of the present invention to provide an apparatus which can safely and effectively hold and retain a standing ladder when not in use.

It is a further object of the present invention to provide an apparatus which can be mounted on a wall to thereby minimize the space occupied by the ladder while it is being held on the apparatus.

It is an additional object of the present invention to provide an apparatus which can be reversible and hold all different types of ladders, with the surface used depending on the particular type of ladder being held and retained.

Further novel features and other objects of the present invention will become apparent from the following detailed description, discussion and the appended claims, taken in conjunction with the drawings.

DRAWING SUMMARY

Referring particularly to the drawings for the purpose of illustration only and not limitation, there is illustrated:

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
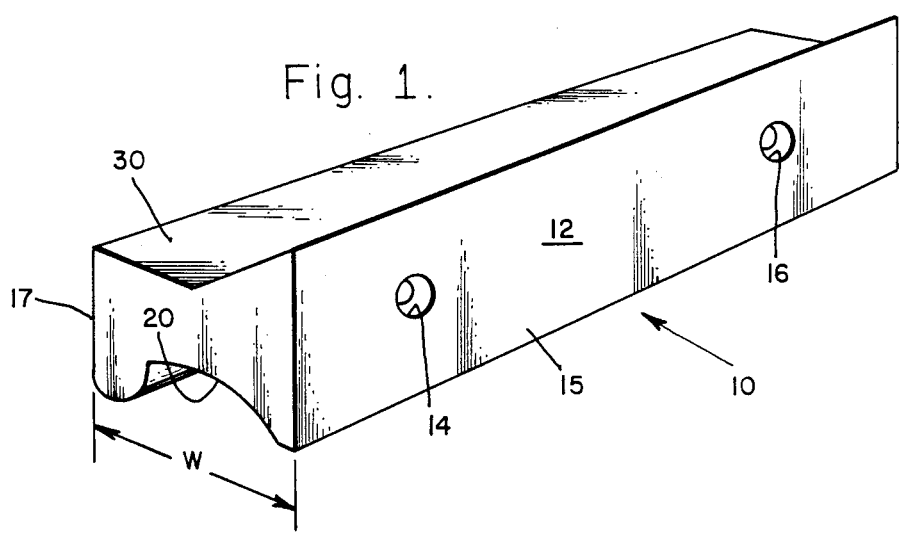
FIG. 1 is a perspective view of the present invention apparatus for holding and retaining a ladder.
Figure 2:
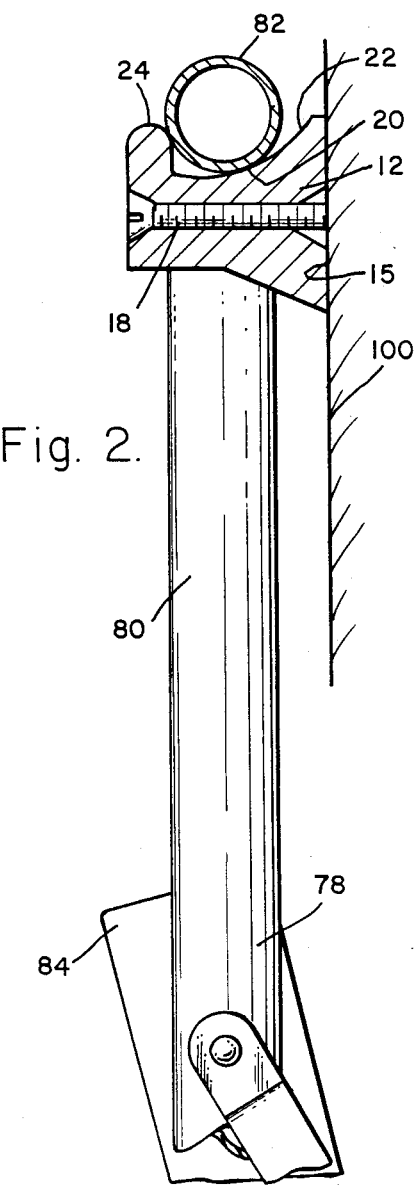
FIG. 2 is a side elevational view in partial cross-section illustrating the present invention with the arcuate surface and stopping block portion used to hold and retain a ladder such as a step ladder or extension ladder.

Referring particularly to FIG. 1, there is shown at 10 the present invention ladder holding and retaining apparatus. The ladder holder 10 is comprised of a solid block of material 12 which can be made out of any material such as wood, plastic, or metal. The block includes mounting means by which the block can be mounted to a wall. One type of mounting means is illustrated in FIG. 1. This comprises at least one transverse opening 14 extending through the entire width "W" of the block 12. In the preferred embodiment, there are two such openings 14 and 16 spaced apart so that the apparatus 10 can be mounted in a balanced fashion. It will be appreciated that any multiplicity of such openings are within the spirit and scope of the present invention. Each opening such as 14 and 16 accommodates a fastening member such as a screw 18 (see FIGS. 2 and 3) which is inserted through the opening and screwed into a mounting surface 100 (see FIGS. 2 and 3). The preferred mounting surface 100 is a wall, but any other surface is also within the spirit and scope of the present invention. It will also be appreciated that any other type of mounting means such as glue, mating slotted members (one affixed to the apparatus 10 and the other affixed to the mounting surface 100) is also within the spirit and scope of the present invention. Preferably, the mounting means is removable so that alternative surfaces on the apparatus can be used, depending on the type of ladder to be held and retained.

The ladder holding apparatus 10 comprises two operating surfaces. The first operating surface 20 is shown in FIG. 1 and shown in greater detail in FIG. 2. First operating surface 20 comprises a transverse section 22 adjacent the mounting surface 100 and a stopping block section 24 at its outwardmost end. In the preferred embodiment, the transverse section 22 is generally arcuate and sloping downwardly and away from the mounting surface 100 so that the portion of the ladder retained thereon will not abut the mounting surface and scratch it. The type of ladder 78 best held by the first operating surface 20 is a step ladder which includes a metal frame by which the ladder 78 is carried. The metal frame 80 generally extends lengthwise coinciding with the steps of the ladder 78 and further includes a transverse portion 82. The transverse portion 82 of handle 80 rests on trasverse section 22 of first operating surface 20 and abuts stopping block section 24. In this way, the ladder 78 rests on its transverse handle portion 82 and hangs from the ladder retaining means 10. The steps of the ladder 78, one of which is shown at 84 hang below the ladder retaining apparatus 10. Preferably, the ladder retaining apparatus 10 is sufficiently high on the mounting surface 100 so that the ladder doesn't touch the floor, but this is not required. Extension ladders can also be mounrted and held this way, with one rung or step of the extension ladder resting on the transverse section 22 and abutting the stopping block section 24.

Figure 3:
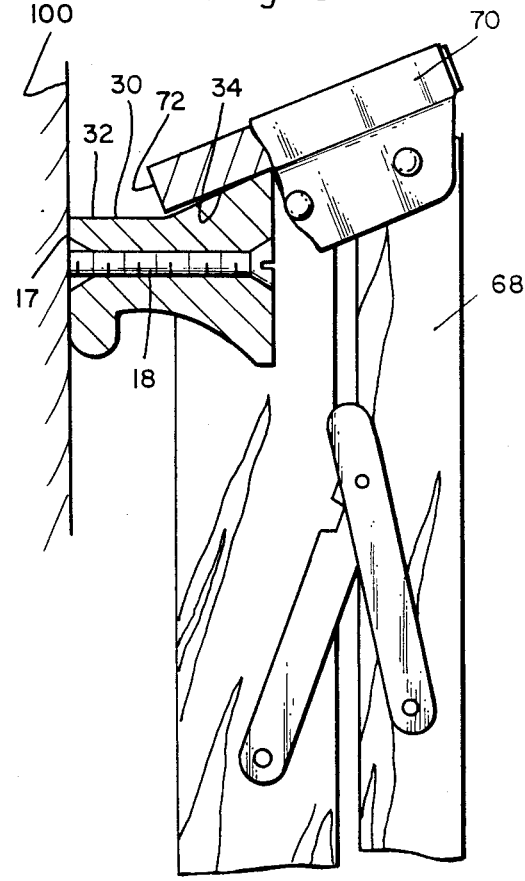
FIG. 3 is a side elevational view in partial cross-section illustrating the present invention with the lateral section and sloped section portion used to hold and retain a ladder such as a standing ladder.

In the second operating surface, shown as 30 in FIG. 1 and illustrated in greater detail in FIG. 3, a transverse section 32 which is preferably straight rather than arcuate lies adjacent mounting surface 100 and a sloped section 34 lies at the outwardmost portion of second operating surface 30. The sloped section 34 is preferably at a downward angle relative to the transverse section 32 and mounting surface 100. The top 70 of a ladder 68 rests on sloped surface 34 such that the ladder's end 72 closest to the mounting surface 100 just rests on transverse surface 32. In this way, the ladder 68 can hang from the ladder holding apparatus 10.

The two operating surfaces 20 and 30 are opposite each other so that the ladder holding apparatus 10 need only be rotated by 180 degrees to go from one surface to the other. When first operating surface 20 is in use, sidewall 15 lies adjacent mounting surface 100. When second operating surface 30 is in use, sidewall 17 lies adjacent mounting surface 100.

It will be appreciated that the ladder holding apparatus 10 can be formed with either first operating surface 20 alone or second operating surface 30 alone, and not both surfaces. However, both surfaces together form a more efficient apparatus. In addition, the additional material thickness adjacent the wall (see FIGS. 2 and 3) when both types of surfaces are combined in one apparatus provides greater strength to the apparatus 10.

Describing the invention will the first embodiment alone, the present invention is an apparatus for holding a ladder comprising: (a) a body 12; (b) said body including mounting means 14 for attaching the body to a mounting surface 100; and (c) an operating surface 20 including a transverse section 22 aligned adjacent the mounting surface 100 and a stopping block section 24 adjacent the end of the transverse section furthest from the mounting surface. The invention in accordance with claim 1 wherein said The transverse section 22 may be arcuate and slope downwardly and away from the mounting surface.

Describing the invention with the second embodiment alone, the present invention is an apparatus for holding a ladder comprising: (a) a body 12; (b) said body 12 including mounting means 14 for attaching the body to a mounting surface 100; and (c) an operating surface 30 including a transverse section 32 aligned adjacent the mounting surface 100 and a sloped section 34 which slopes downwardly toward the transverse section and toward the mounting surface with the lowermost portion of the sloped section adjacent the end of the transverse section furthest from the mounting surface. The angle of slope may be angle degree, for example approximately 45 degrees. In the preferred embodiment, transverse section 32 is horizontally aligned.

Described with both embodiments in one apparatus the present invention is an apparatus for holding a ladder comprising: (a) a body 12; (b) said body including mounting means 14 for attaching the body to a mounting surface 100; (c) a first operating surface 20 located on one surface of the body including a transverse section 22 aligned adjacent the mounting surface 100 and a stopping block section 24 adjacent the end of the transverse section furthest away from the mounting surface; and (d) a second operating surface 30 located on a second surface oppositely disposed to the surface on which the first operating surface is located, and when rotated 180 degrees in both the horizontal and vertical plain includes a transverse section 32 aligned adjacent the mounting surface and a sloped section 34 which slopes downwardly toward the transverse section and toward the mounting surface with the lowermost portion of the sloped section adjacent the end of the transverse section furthest from the mounting surface.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms of modification in which the invention might be embodied or operated.

The invention has been described in considerable detail in order to comply with the patent laws by providing full public disclosure of at least one of its forms. However, such detailed description, is not intended in any way to limit the broad features or principles of the invention, or the scope of patent monopoly to be granted.

What is claimed is:

1. An apparatus for holding a ladder comprising:
   a. a body;
   b. said body including mounting means for attaching the body to a mounting surface;
   c. a first operating surface located on one surface of the body including a transverse section aligned adjacent the mounting surface and a stopping block section adjacent the end of the transverse section furthest away from the mounting surface; and
   d. a second operating surface located on a second surface oppositely disposed to the surface on which the first operating surface is located, and when rotated 180 degrees in both the horizontal and vertical plain includes a transverse section aligned adjacent the mounting surface and a sloped section which slopes downwardly toward the transverse section and toward the mounting surface with the lowermost portion of the sloped section adjacent the end of the transverse section furthest from the mounting surface.

2. The invention in accordance with claim 1 wherein said transverse section of said first operating section is arcuate and slopes downwardly and away from the mounting surface.

3. The invention in accordance with claim 1 wherein said transverse section of said second operating section is horizontally aligned.

4. The invention in accordance with claim 1 wherein said mounting means further comprises at least one transverse opening extending through the entire width of the body between said first operating surface and said second operating surface and receiving a fastening member for attaching the body to the mounting surface.

5. The invention in accordance with claim 4 wherein said fastening member is a screw.

6. The invention in accordance with claim 1 wherein said mounting surface is a wall.

* * * * *